United States Patent
Koistinen

(10) Patent No.: US 7,626,976 B2
(45) Date of Patent: Dec. 1, 2009

(54) DSL ACCESS SYSTEM NEGOTIATING A VOICE CODEC TYPE TO BE USED BETWEEN TWO SYSTEMS

(75) Inventor: Tommi Koistinen, Vantaa (FI)

(73) Assignee: Wi-Lan, Inc., Ottawa, On (CA)

(*) Notice: Subject to any disclaimer, the term of this patent is extended or adjusted under 35 U.S.C. 154(b) by 845 days.

(21) Appl. No.: 10/294,669

(22) Filed: Nov. 15, 2002

(65) Prior Publication Data
US 2003/0091034 A1 May 15, 2003

Related U.S. Application Data

(63) Continuation of application No. PCT/FI01/00463, filed on May 14, 2001.

(30) Foreign Application Priority Data
May 15, 2000 (FI) .................................. 20001162

(51) Int. Cl.
H04L 12/66 (2006.01)
(52) U.S. Cl. .................... 370/352; 370/465; 370/466
(58) Field of Classification Search ......... 370/352–356, 370/252, 328, 401, 456, 465–468, 385
See application file for complete search history.

(56) References Cited

U.S. PATENT DOCUMENTS 5,594,726 A * 1/1997 Thompson et al. .......... 370/485
5,999,563 A 12/1999 Polley et al.
6,108,560 A * 8/2000 Navaro et al. .............. 455/517
6,256,612 B1 * 7/2001 Vo et al. ..................... 704/500

(Continued)

FOREIGN PATENT DOCUMENTS

EP 0 917 314 A2 5/1999

(Continued)

OTHER PUBLICATIONS

"Speech Technology: How to Enhance GSM Audio Quality and Evolve to Third Generation", Ian Goetz, Mar. 2000, retrieved on Aug. 16, 2001 from the internet: <URL:http://www.coherent.com/articles/teldevelap0300.html.

(Continued)

Primary Examiner—Ayaz R Sheikh
Assistant Examiner—Chuong T Ho
(74) Attorney, Agent, or Firm—Kramer & Amado, P.C.

(57) ABSTRACT

An access system, such as a DSL (Digital Subscriber Line), includes a multiplexer for connecting subscriber devices, such as telephones and/or IP terminals, to a subscriber line; and an access multiplexer for connecting subscriber lines to a backbone network. The access system may also include a gateway for connecting the backbone network to a first system. When the access system receives a voice call to a second system via the telephone system and the first system employs a voice coding method, the access system is arranged to negotiate with the second system a type of voice codec to be used in both the first and second system. The access systems is configured to transmit an encoded voice signal from the subscriber device or the multiplexer to the first system and to transmit an encoded voice signal from the first system to the subscriber device or the multiplexer.

11 Claims, 1 Drawing Sheet

U.S. PATENT DOCUMENTS

| | | | | |
|---|---|---|---|---|
| 6,466,584 | B1 * | 10/2002 | Maxwell et al. | 370/465 |
| 6,671,367 | B1 * | 12/2003 | Graf et al. | 379/229 |
| 7,068,664 | B2 * | 6/2006 | Arakawa | 370/395.6 |
| 7,307,980 | B1 * | 12/2007 | Shah | 370/352 |
| 7,379,877 | B2 * | 5/2008 | Lehtimaki | 704/500 |
| 7,483,418 | B2 * | 1/2009 | Maurer | 370/354 |

FOREIGN PATENT DOCUMENTS

| | | |
|---|---|---|
| EP | 0 928 123 A2 | 7/1999 |
| EP | 0 975 117 A2 | 1/2000 |
| GB | 2 335 332 A | 9/1999 |
| WO | WO 00/21258 | 4/2000 |
| WO | WO 00/24210 | 4/2000 |
| WO | WO 01/26323 A1 | 4/2001 |

OTHER PUBLICATIONS

"Tandem Free Operation (Stage 1), 3rd Generation Partnership Project 2 "3GPP2, " Revision 0," 3GPP2 S.R0014, Version 1.0, Version Date: Dec. 13, 1999.

Smith, Paxton et al., "Speaker Selection for Tandem-Free Operation VoIP Conference Bridges," Proceedings of IEEE Workshop Speech Coding, Oct. 2002, p. 120-122 (Tsukuba, Japan).

* cited by examiner

DSL ACCESS SYSTEM NEGOTIATING A VOICE CODEC TYPE TO BE USED BETWEEN TWO SYSTEMS

REFERENCE TO RELATED APPLICATIONS

This application is a Continuation of International Application PCT/FI01/00463 filed May 14, 2001 which designated the U.S. and was published under PCT Article 21(2) in English.

BACKGROUND OF THE INVENTION

1. Field of the Invention

The invention relates to access systems and particularly to DSL (Digital Subscriber Line) access systems.

2. Description of the Related Art

DSL (Digital Subscriber Line) is a technology for bringing high-bandwidth information to e.g. homes and small businesses over ordinary copper telephone lines. Digital Subscriber Line is a technology that assumes digital data does not require change into analog form and back. Digital data is transmitted to a subscriber directly as digital data and this allows a much wider bandwidth to be used for transmitting the data than in traditional telephone systems. Several modulation technologies are used by various kinds of DSL, although these are being standardized by the International Telecommunication Union (ITU).

DSL allows a signal to be separated so that some of the bandwidth is used to transmit an analog signal whereby it is possible to use e.g. a telephone and a computer on the same line and at the same time.

Voice is being introduced into the DSL access systems (VoDSL=Voice over DSL). For example, 32×64 kbps voice channels may be multiplexed among other data traffic into one DSL line, as depicted in FIG. 1. The voice channels may additionally be compressed in a customer premises multiplexing device (which includes a DSL modem). Voice compression extends the multiplexing capacity e.g. by a factor of 8:1 (with a G.729 voice codec). The encoded voice packets are then transferred in ATM (Asynchronous Transfer Mode) cells over DSL, or in IP (Internet Protocol) packets (over ATM) over DSL via the DSL Access Multiplexer (DSLAM), to the voice gateway which decodes the voice coding and interfaces the telephone switch with a 64 kbps G.711 format.

If a voice call takes place from a DSL access system to another system employing a voice coding method, e.g. another DSL access system or a mobile phone system (the operation of a mobile communication network involves a transcoder on the connection between a mobile station and a mobile services switching center), voice encoding and decoding are performed twice for the call. This is known as tandem coding. Tandem coding presents a problem as it degrades speech quality due to the extra voice encoding and decoding.

SUMMARY OF THE INVENTION

The object of the invention is to provide an equipment such that the above problems can be solved. This is achieved with an access system, an access system multiplexer and an access system gateway unit.

The invention is based on the idea that, when having a voice call to another system employing a voice coding method, the access system is arranged to negotiate with the other system a voice codec type to be used in both systems; to transmit an encoded voice signal from a subscriber device or a multiplexer directly to the other system; and to transmit an encoded voice signal from the other system directly to the subscriber device or multiplexer in order to avoid double voice coding of the voice signal.

An advantage of the invention is that it offers better speech quality when calls are made to e.g. mobile phones because voice signals will be encoded and decoded only once in the end-to-end transmission path from a multiplexing device to a mobile phone.

BRIEF DESCRIPTION OF THE DRAWINGS

In the following, the invention will be described in greater detail in connection with preferred embodiments and with reference to the accompanying drawings, in which.

DETAILED DESCRIPTION OF THE INVENTION

Even though the use of the invention will be described below in connection with a DSL access system, this does not restrict the application of the invention in other access systems.

Figure 1:
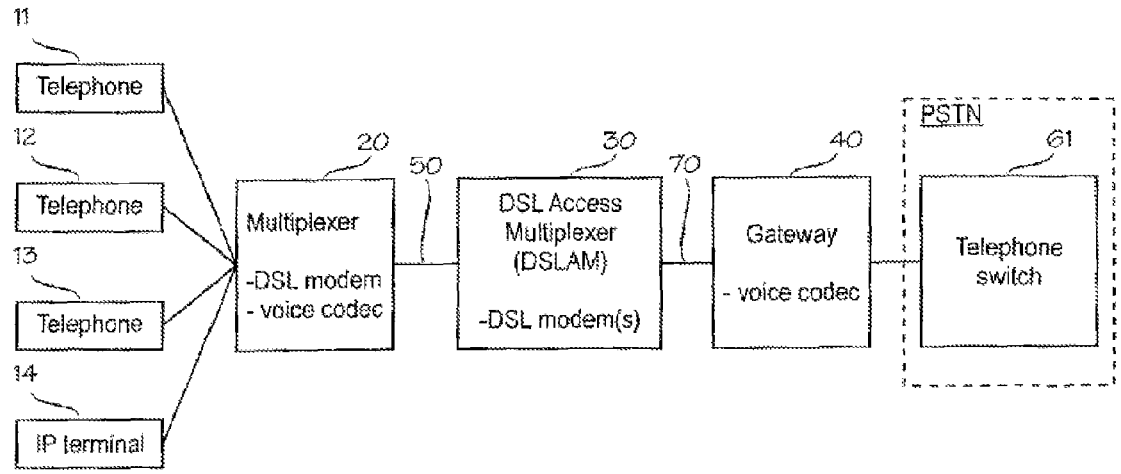
FIG. 1 shows elements of a DSL access system according to prior art and FIG. 2 shows elements of a DSL access system according to an embodiment of the invention.

FIG. 1 shows a typical DSL access system configuration according to prior art. Subscriber devices 11, 12, 13 and 14 are connected to a DSL line 50 via a multiplexer 20 (also known as Integrated Access Device, IAD) which comprises a DSL modem and provides access to the DSL system. The DSL line 50 can carry both data and voice signals, so the subscriber devices can be e.g. telephones 11, 12 and 13 or IP terminals 14 (such as a PC connected to the multiplexer 20 by Ethernet). For voice connections, 32×64 kbps voice channels, for example, may be multiplexed among other data traffic into one DSL line 50. The voice channels may additionally be compressed in the customer premises multiplexing device 20. Voice compression extends the multiplexing capacity e.g. by a factor of 8:1 (with a G.729 voice codec). The encoded voice packets are then transferred to a voice gateway 40, for example in ATM (AAL2, ATM Adaptation Layer 2) cells over the DSL 50, or in IP packets (over ATM) over the DSL 50 via the DSL Access Multiplexer (DSLAM) 30, which also comprises a DSL modem, and a backbone network 70, which employs e.g. ATM, or IP, or IP over ATM. The voice gateway 40 decodes the voice coding and interfaces a PSTN (Public Switched Telephone Network) via a telephone switch 61 with e.g. a 64 kbps PCM format according to the ITU (formerly CCITT) recommendation G.711. In pulse code modulation (PCM) functioning at the rate of 64 kbps the voice signal is sampled at every 125 microseconds, i.e. the rate of sampling is 8 kHz, and the amplitude of each sample is quantized to an 8 bit code by using A-law or μ-law coding. An IP-terminal 14 functioning as a subscriber device can perform the voice encoding/decoding instead of the multiplexer 20 voice codec. It should be noted that there can be more network elements than those shown in FIG. 1.

ATM is a general-purpose transfer mode which combines the advantages of circuit-switched and packet-switched data transmission. ATM is based on cell-switched data transmission, the data to be transmitted being split into bits having a given length, i.e. cells. Telecommunication applications which require constant capacity or delay and which have conventionally used a circuit-switch connection, are prioritized in filling the cells. Applications not requiring constant capacity or delay transmit their data in the remaining cells in the same way as on a packet-switched connection. An ATM cell comprises 53 bytes, of which 48 bytes are payload and 5 bytes are reserved for header data. In present ATM networks, the transfer rate may vary, depending on the connection, between 64 kbps and 622 Mbps, but in the future several Gbps will be reached.

The TCP/IP protocol (Transmission Control Protocol/Internet Protocol) acts as the data transmission protocol in the Internet, the special advantage being its independence of different device or software architectures, which makes it the most generally used network protocol in the world, especially in local networks. In Internet-based networks, the IP protocol is the actual network protocol which serves to route an addressed IP message from a source station to a destination station. A transport protocol, either TCP or UDP (User Datagram Protocol), is run above the IP network protocol. The transport protocol attends to the transfer of data packets from a source port to a destination port.

A protocol called Tandem Free Operation (TFO) has been developed for the GSM system (Global System for Mobile communication), in order to prevent tandem coding in the case of mobile-to-mobile calls (MMC) in which two transcoder units are connected in series to each MMC call, two voice encodings and decodings thus being performed on the call. TFO is based on signalling in a mobile communication network, the signalling comprising forwarding an indication to the transcoders upon set-up of an MMC call to the effect that they are to operate in a tandem coding prevention mode, whereby the transcoder does not at all encode or decode voice. The signalling is transferred on a voice channel with speech parameters and other control information, i.e. as inband-signalling. In the tandem coding prevention mode, speech is encoded only in mobile stations and speech parameters are only transferred through the mobile communication network with slight changes from one base station via two tandem-connected transcoders to a second base station. In mobile communication networks, circuit-switched technology based on pulse code modulation (PCM) has been conventionally used in inter-MSC data transmission, i.e. PSTN or ISDN-based (Integrated Services Digital Network) network solutions. In this case, when a transcoder is in a tandem coding prevention mode, it combines control, synchronization and error correction information, for example, with speech parameters arriving from a mobile station via a base station, and adapts the data to PCM timeslots without transcoding. In the transcoder, encoded speech is adapted to a PCM channel such that one or more least significant bits of PCM samples constitutes a subchannel into which lower-rate speech encoded by the mobile station is multiplexed. These PCM samples and their subchannels are transferred to the receiving transcoder which sends the speech parameters further to the receiving base station either as such or making slight changes indicated by the control information. Tandem Free Operation is described in greater detail in the ETSI (European Telecommunications Standards Institute) specifications: ETSI TS 101 108 V7.0.1 (1999-07), ETSI TS 101 732 V8.0.0 (2000-03) and GSM.08.62 V8.0.0 (2000-03).

Figure 2:
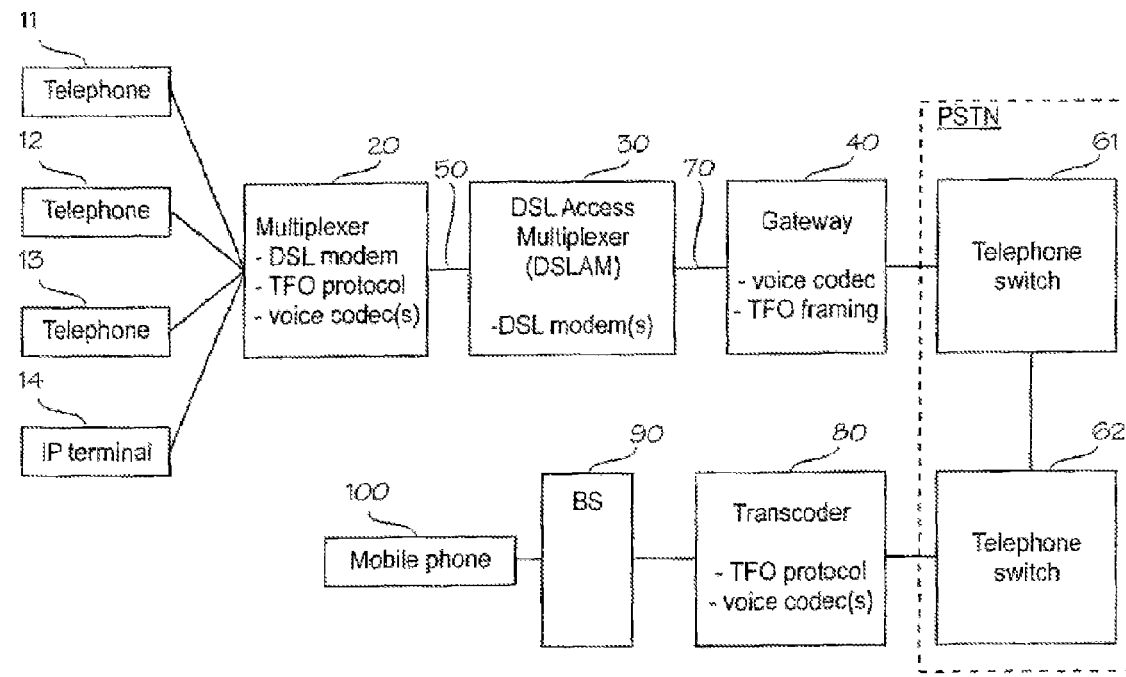

FIG. 2 shows a DSL access system according to an embodiment of the invention. In FIG. 2 the DSL access system is connected to a mobile phone system via PSTN and telephone switches 61 and 62. A call from a DSL subscriber device 11, 12, 13 or 14 to a mobile phone 100 is connected in the mobile phone system via a transcoder unit 80, which comprises a voice codec, and a base station 90. The TFO protocol is supported by the mobile phone system transcoder 80 as described earlier. According to the invention, the TFO protocol is applied to the DSL system e.g. as shown in FIG. 2 where the DSL multiplexer 20 supports the TFO protocol and takes care of the negotiation with the peer system about the voice codec type to be used. This embodiment of the invention in which the multiplexer 20 supports the TFO protocol is advantageous because the multiplexer 20 can directly change the voice codec type it is using to match the voice codec type of the peer system. The gateway unit 40 forwards the encoded voice packets to the least significant bits of the 64 kbps PCM telephone system (and vice versa in the other direction) according to the TFO specifications if the end-to-end codecs match each other. It should be noted that some other protocol than TFO could also be used. The use of the TFO protocol, however, is advantageous since it is already supported by many existing mobile phone systems.

More specifically described, the operation of the DSL system according to FIG. 2 is as follows: the multiplexer 20 must first identify the peer system as a system that is TFO capable e.g. by sending and monitoring request (TFO_REQ) and acknowledgement (TFO_ACK) messages that the peer entity supports TFO. Next the multiplexer 20 must check that the systems are using the same voice codec. If they do not use the same voice codec, the multiplexer 20 can modify its voice codec type if it supports more than one voice codec type. It is advantageous that the multiplexer 20 supports several voice codec types e.g. types G.711, G.723.1, G.729, GSM AMR, GSM FR, GSM HR and GSM EFR. The voice codec type to be used can be checked and negotiated between the systems e.g. by signalling of current voice codec, voice codec capability and acknowledgement messages. If the systems are using the same voice codec the gateway unit 40 may continue inserting TFO frames into the least significant bit(s) of the PCM octet present on the interface 61 with the PSTN system. These frames contain the speech parameters (encoded voice signal) obtained from the multiplexer 20 via the access multiplexer 30. In other words, voice data is transmitted between the multiplexer 20 and the gateway unit 40 in a compressed form, e.g. in a 16 or 8 (G.729) kbps channel. In the gateway unit 40 this 16/8 kbps channel is then placed, as such, into the 64 kbps channel (G.711) leading to the PSTN i.e. into the least significant bits thereof. TFO signalling (0.5 kbps) is inside this 16/8 kbps channel, i.e. it steals a certain number of sychronization bits of the 16/8 kbps channel. The gateway unit 40 advantageously decodes the voice encoded signal (8/16 kbps) from the multiplexer 20, as in an operation without TFO, to a 64 kbps format and combines both encoded 8/16 kbps channel and decoded 64 kbps channel into one 64 kbps channel (the 16/8 kbps channel is placed into the least significant bits of the 64 kbps channel) leading to the PSTN so that the peer system has two formats available: G.711 (64 kbps) and e.g. G.729 (8 kbps). Now, if TFO for some reason does not function in the peer system, normal operation can be used because a decoded 64 kbps format is also readily available. When voice encoded data is transmitted to the other direction (from the PSTN towards the multiplexer) through the gateway unit 40, the gateway unit 40 takes from the least significant bits of the G.711 (64 kbps) channel G.729 (8 kbps) information, for example, and transmits it as such towards the multiplexer 20. If the subscriber device from which the connection is to be established is an IP terminal 14 comprising a voice codec, it is possible that the voice is encoded/decoded in said IP terminal, instead of the multiplexer 20. In this case it is also possible that the IP terminal supports the TFO protocol and negotiates directly with the peer system the voice codec type to be used, whereby the gateway unit 40 does the TFO framing as described above and the multiplexer 20 merely forwards the IP packets sent by the IP terminal towards the gateway unit 40 and vice versa.

Another possible embodiment of the invention is that the TFO protocol is supported only by the gateway unit 40. In that case the gateway unit 40 negotiates with the peer system (e.g. by using TFO signalling in a similar manner as described above) the voice codec type to be used. The gateway unit 40 must then be able to recognise the voice codec type used by the multiplexer 20 or the IP terminal 14, or, alternatively, the gateway unit 40 must be able to negotiate with the multiplexer 20 or the IP terminal 14 the voice codec type to be used e.g. by using H.323 protocol messages, H.323 being a standard defined by the ITU for packing voice and video image used in video conference programs and for controlling calls. H.323 is used for call set-up and adaptation negotiations, and for reserving a connection required by real-time speech in an IP network. Once the voice codecs of both systems are compatible, the encoded voice signal between the multiplexer 20 (or IP terminal 14) and the peer system is transmitted through the gateway unit 40 without encoding or decoding according to the TFO protocol as described earlier.

The system to which a voice call is to be established from the DSL access system according to the invention can be a mobile phone system, another DSL access system or any other access system using voice coding and being able to acknowledge the voice codec type it is using or to negotiate the voice codec to be used e.g. by employing the TFO protocol or similar protocol. It is possible that the DSL system and the other system are interconnected through another network than the PSTN, or directly, without any interconnecting network. It is also possible that the DSL system and the other system are interconnected directly through backbone network 70 (e.g. an IP or ATM network) without using a gateway unit 40. In this case the TFO protocol (or similar protocol) can be used for negotiating the voice codec to be used.

It is obvious to a person skilled in the art that as technology progresses the basic idea of the invention can be implemented in a variety of ways. Thus the invention and its embodiments are not restricted to the above-described examples but they may vary within the scope of the claims.

The invention claimed is:

1. A digital subscriber line (DSL) access system comprising:
   a multiplexer for connecting a subscriber device to a digital subscriber line;
   a digital subscriber line access multiplexer (DLSAM) for connecting the digital subscriber line to a backbone network; and
   a gateway unit for connecting the backbone network to a second system wherein the DSL access system is configured to apply a voice coding technique between the gateway unit and the subscriber device or the multiplexer for a voice call communicating wherein, when the access system transmits a voice call between the subscriber device and the second system employing voice coding, the access system is configured to use a TFO (Tandem Free Operation) protocol on a first communication channel and configured to use a non-TFO protocol on a second communication channel,
   wherein the first communication channel comprises an encoded 8/16 kbps channel and the gateway is configured to receive said first communication channel and to generate a corresponding decoded 64 kbps channel, and the second communication channel comprises the decoded 64 kbps channel, and
   wherein the gateway unit is configured to combine the first and second communication channels into a third channel and present the third channel to the second system such that both the TFO protocol and the non-TFO protocol are available to the second system.

2. The DSL access system of claim 1, wherein the multiplexer comprises a digital subscriber line (DSL) modem.

3. The DSL access system of claim 1, wherein the third channel comprises a 64 kbps channel and the access system is configured to place the TFO protocol into the least significant bits of the 64 kbps channel.

4. The DSL access system of claim 1 wherein the multiplexer comprises at least one voice codec selected from the group consisting of G.7II, G.723.I, G.729, GSM AMR, GSM FR, GSM HR, and GSM EFR.

5. The DSL access system of claim 1 wherein the access system is configured to use ATM (Asynchronous Transfer Mode) protocol between the multiplexer and the gateway unit.

6. The DSL access system of claim 1 wherein the access system is configured to use Internet protocol (IP) between the multiplexer and the gateway unit.

7. A digital subscriber line (DSL) access system comprising:
   a multiplexer for connecting a subscriber device to a digital subscriber line;
   a digital subscriber line access multiplexer (DSLAM) for connecting the digital subscriber line to a backbone network; and
   a gateway unit for connecting the backbone network to a second system,
   wherein the DSL access system is configured to apply a voice coding technique between the gateway unit and the subscriber device or the multiplexer for a voice call,
   wherein the multiplexer transmits encoded voice data in a 16/8 kbps channel through the DSLAM to the gateway unit using the voice coding technique,
   wherein the gateway unit is configured to decode encoded voice data from the 16/8 kbps channel to a decoded 64 kbps channel containing decoded voice data and the gateway unit inserts the encoded voice data into the least significant bits of the decoded 64 kbps channel, and
   wherein the gateway unit transmits both encoded and decoded voice data to the second system by combining a TFO protocol on the encoded 16/8 kbps channel and a non-TFO protocol on the decoded 64 kbps into a channel transmitted to the second system such that both the TFO protocol and the non-TFO protocol are available to the second system.

8. The DSL access system of claim 7 wherein the multiplexer comprises at least one voice codec selected from the group consisting of G.7II, G.723.I, G.729, GSM AMR, GSM FR, GSM HR, and GSM EFR.

9. The DSL access system of claim 7 wherein the access system is configured to use ATM (Asynchronous Transfer Mode) protocol between the multiplexer and the gateway unit.

10. The DSL access system of claim 7 wherein the access system is configured to use Internet protocol (IP) between the multiplexer and the gateway unit.

11. A method for connecting a subscriber device to a digital subscriber line through an integrated access device to communicate voice packets, the method comprising:
    determining if a peer entity supports tandem free operation (TFO), and if the peer entity supports TFO:
    identifying a voice codec being used by the peer entity;
    encoding voice packets according to the identified voice codec; and transmitting encoded voice packets in a 8/16 kbps channel to a gateway unit through a digital subscriber line access multiplexer (DSLAM);

decoding encoded voice packets from the 8/16 kbps channel into a decoded 64 kbps channel containing decoded voice packets;

inserting encoded voice packets from the 8/16 kbps channel into the least significant bits of the decoded 64 kbps channel; and transmitting both encoded and decoded voice packets to the peer entity, wherein the gateway unit combines a TFO protocol on the 8/16 kbps channel and a non-TFO protocol on the decoded 64 kbps channel into a channel having both the encoded and decoded voice packets transmitted to the peer entity, such that both the TFO protocol and the non-TFO protocol are available to the peer entity.

* * * * *